United States Patent Office 3,651,024
Patented Mar. 21, 1972

3,651,024
ANIONIC SOLUTION POLYMERIZATION OF LAUROYL LACTAM
Michel Biensan, Billere, and Philippe Bruant, Pau, France, assignors to Societe Nationale des Petroles d'Aquitaine Tour Aquitaine, Courbevoie, France
No Drawing. Filed Dec. 23, 1969, Ser. No. 887,761
Claims priority, application France, Dec. 31, 1968, 182,522
Int. Cl. C08g 20/18
U.S. Cl. 260—78 L
10 Claims

ABSTRACT OF THE DISCLOSURE

Polyamide powders are obtained by adding to a lactam solution, a fine polyamide powder in an amount of at least 20% of the total weight of the lactam and polyamide and thereafter heating the solution, an anionic catalyst and an activator to a polymerization temperature below the melting point of the lactam.

---

The present invention relates to a process for obtaining polyamide powders by solution polymerization of lactams and more particularly of lactams containing more than 10 carbon atoms in the ring. The invention is concerned particularly with the manufacture of polyomega-lauroyl lactam in powder form, better known under the name of nylon-12.

The anionic polymerization of lactam is well-known at the present time; the conventional method consists in polymerizing the lactam in anhydrous medium by means of a catalyst, such as sodium or one of its compounds, such as sodium hydride or sodium methylate, and an activator such as the lactam-N-carboxyanilides, the isocyanates, carbodiimides, cyanimides, acyl lactams, triazines, ureas, N-substituted imides or others. In order directly to obtain the polymer in powder form and thus to avoid the subsequent steps of dissolving and re-precipitating the product, it has been considered to carry out this polymerization in an organic medium containing the lactam in solution or in suspension and not dissolving the polyamide, which therefore precipitates as it is formed. This method has given good results as regards the production of powders of polycaprolactam or nylon-6. However, the polymerization of lactams with more than 10 carbon atoms in the ring and particularly the polymerization of lauroyl lactam encounters numerous difficulties as soon as it is desired to obtain the pulverulent polymer directly. Formation of lumps or large agglomerates occurs as soon as it is attempted to polymerize these lactams at temperatures permitting a speed of reaction and a yield suitable for an industrial operation. It is nevertheless possible to avoid these lump formations and to obtain polymers as a fine powder, even with lactams having more than 10 carbon atoms in the ring, by causing the temperature to rise in accordance with a certain specific progression until a certain quantity of monomer is transformed into pulverulent polymer. This procedure is very efficient, but it requires supervision or exact control throughout the entire polymerization period.

The process according to the invention overcomes these different disadvantages and enables lactams having more than 10 carbon atoms in the ring to be polymerized in solution, at a temperature which is sufficiently high to be able to reach a speed and a yield appropriate for an industrial operation, without any danger of the lump formation or the formation of too large grains of polymer, and without continuously controlling the temperature, which is preferably kept constant.

The new process consists in polymerizing in solution, preferably in an organic solvent, with the aid of an anionic catalyst and an activator, a lactam having more than 10 carbon atoms in the ring, at a temperature which is below the melting point of the monomer, after having added, preferably prior to the addition of the catalyst and/or the activator, a quantity of fine polyamide powder larger than or equal to 20% by weight of the total monomer plus polymer.

The added polyamide is preferably of the same nature as the polyamide to be prepared.

In one advantageous embodiment of the present invention, the temperature is kept constant throughout the duration of the polymerization or during the major part of the polymerization. It is also possible to commence the polymerization at a fairly low temperature and quickly to raise the latter to the selected fixed temperature, or to terminate the polymerization at a temperature different from that which has been maintained during practically all the polymerization period.

In the case of lauroyl lactam, the process according to the invention is preferably conducted at a temperature which is between 120° and 150° C. and advantageously between 120° C. and 135° C.

In practice, the process according to the invention can be carried out with quantities of polyamide powder, introduced in advance, of 20 to 60% with respect to the total monomer to be polymerized plus introduced polymer. This proportion depends moreover on the temperature at which it is desired to conduct the polymerization. In the case of lauroyl lactam, the proportions capable of being added are from 20 to 30%, if it is desired to conduct the polymerization at 120° C. or at lower temperatures; from 25% to 35% if it is desired to conduct the polymerization at 130° C.; and from 30% to 40% if it is desired to conduct the polymerization at 140° C. It is inadvisable to add proportions of polyamide-12 powder which are smaller than the proportions indicated for each temperature, because of the danger of the lump formation. The minimum proportion of powder to be added in accordance with the temperature at which it is desired to effect the polymerization is calculated from the relation $p=0.5T-40$, T being a temperature between 120° C. and 150° C.; that is to say, according to the temperature, the minimum proportion will be 20% for 120° C. and below, and 35% at 150° C., which is the maximum temperature at which it is possible to polymerize the lactam, while obtaining pulverulent products. It is generally advantageous to add larger powder quantities than the indicated minimum.

According to one preferred embodiment of the present invention, the activator and/or the catalyst, after having already added the polyamide powder, are introduced continuously throughout the polymerization period. According to one variant of this embodiment, the activator and/or catalyst are introduced until at least 20% of the monomer is converted into polyamide, and preferably 60 to 80%, after which the remainder is introduced all at once.

According to another embodiment, the process is carried out continuously in a single reactor or in a series of reactors in cascade formation, arranging for the speed of introduction of the monomer and the speed at which the polymer is eliminated to be such that the monomer is always in the presence of a quantity of polyamide equal to or greater than 20% by weight of the total of monomer plus polymer present in a reactor.

It is understood that the other general polymerization conditions according to the invention are those of the prior art. It is in, particular, possible to employ all the anionic catalysts which can be used for this purpose and particularly the alkali metals, the alkali hydrides and the alkali methylates. As activator, it is possible to use caprolactam-N-carboxyanilide, the isocyanates, the acetyl lactams, benzoyl lactams, cardodiimides, triazines, ureas, N-substituted imides or other appropriate activators. Nevertheless, within the scope of this invention, preference will be given to the following activators: acetyl caprolactam, benzoyl caprolactam, caprolactam-N-carboxyanilide and the isocyanates.

Among the solvents, it is possible to use one or more liquids, as for example halogenated and nonhalogenated aromatic hydrocarbons, aliphatic hydrocarbons, etc. Especially suitable are solvents such as xylene, cumene, dichlorobenzene, decalin, petroleum ether, etc.

The examples which follow illustrate the invention without limiting it.

EXAMPLE 1

The polymerization takes place in a 2-litre reactor equipped with a mechanical agitator, a reflux condenser, a dry nitrogen flushing system and also openings for the introduction of the reactants. Into this vessel are introduced 500 ml. of xylene, twice distilled with $CaH_2$, and 200 g. of omega-lauroyl lactam, which is caused to dissolve in the xylene at 120° C. To the lactam solution are added 100 g. of fine polyamide-12 powder, i.e. 33% relative to the total, of which the approximate size of the grains is about 20 microns.

2% of sodium hydride, i.e. 0.48 g., are introduced into the suspension and the temperature is rapidly brought to 130° C.

Into the suspension, stirred at the speed of 300 r.p.m., are added all at once 2% of carboxyanilide, i.e. 4.62 g. of this activator, and this temperature is maintained for 1 hour. A polyamide powder with a grain size of about 50 microns is obtained in this way with a yield of 60% relatively to the lactam which is employed.

EXAMPLE 2

As a comparative test, Example 1 is repeated, except for this difference, which is that 40 g. of fine powder instead of 100 g. are introduced, this representing approximately 16% of the total of polymer plus monomer. From the start, there is a lump formation of the polyamide.

EXAMPLE 3

Example 1 is repeated, except that instead of introducing the carboxyanilide all at one, it is added continuously for 1 hour. A polyamide powder is then obtained which has a grain size substantially identical with that of the powder obtained in Example 1, but the yield is here 95% relative to the lactam being used.

EXAMPLE 4

300 g. of lactam-12 are introduced into 400 ml. of dichlorobenzene, whereafter 100 g. of fine polyamide-12 powder, i.e. 25% relative to the total, and 2% of NaH, i.e. 0.48 g., are added. The reaction mixture is brought to and kept at 120° C. and 100 ml. of dichlorobenzene, containing a quantity of benzoyl caprolactam equal to 2 mole percent of the quantity of lactam, are continuously introduced thereinto for 1 hour.

After the introduction of this activator, the medium is further kept for 1 hour at 120° C.

The polymer powder is obtained with a yield of 80%; its inherent viscosity is about 1 and its grain size is from 15 to 80 microns.

EXAMPLE 5

210 g. of lactam-12 are introduced into 400 ml. of xylene, and then 90 g. of fine polyamide-12 powder, i.e. 30% relative to the total, and 2 mole percent of NaH relative to the lactam, are added. The reaction mixture is brought to 120° C. and 2 mole percent of carboxyanilide relative to the lactam are introduced thereinto all at once. The mixture is kept for 2 hours at 120° C. and 180 g. of polyamide-12 are obtained, with an average grain size smaller than 40 microns.

We claim:
1. A process for the solution polymerization of lauroyl lactam which consists essentially of adding to a solution of said lactam and prior to polymerization of said lactam a fine polyamide powder in an amount of 20% to 60% by weight of the total weight of the lactam and polyamide, and thereafter heating said solution, an anionic catalyst and an activator to a polymerization temperature between 120°–150° C., and recovering the polyamide powder thus produced.

2. The process of claim 1 wherein the anionic catalyst is selected from the group consisting of an alkali metal, an alkali metal hydride and an alkali metal methylate.

3. The process of claim 1 wherein the activator is selected from the group consisting of caprolactam-N-carboxyanilide, isocyanate, acetyl lactam, benzoyl lactam, carbodimide, triacine, urea, and N-substituted imides.

4. The process of claim 1 wherein the polymerization temperature is between 120°–135° C.

5. The process of claim 1 wherein the polyamide added is polylauroyl lactam.

6. The process of claim 5 wherein the amount of polylauroyl lactam is at least 0.5T −40 weight percent where T is the polymerization temperature in degrees centigrade.

7. The process of claim 1 wherein the lauroyl lactam is employed in a solvent selected from the group consisting of xylene, cumene, dichlorobenzene, decaline and petroleum ether, the catalyst is selected from the group consisting of sodium, sodium hydride and sodium methylate, and wherein the activator is selected from the group consisting of acetyl caprolactam, benzoyl caprolactam, caprolactam-N-carboxyanilide and isocyanate.

8. The process of claim 7 wherein the polyamide added is polylauroyl lactam.

9. The process of claim 8 wherein the amount of polylauroyl lactam added is at least 0.5T−40 weight percent based on the total weight of the lauroyl lactam and polylauroyl lactam where T is the polymerization temperature in degrees centigrade.

10. The process of claim 9 wherein the catalyst and activator are added to the lactam solution after the polylauroyl lactam powder has been added.

References Cited

UNITED STATES PATENTS

| | | | |
|---|---|---|---|
| 3,061,592 | 10/1962 | Schnell et al. | 260—78 L |
| 3,451,976 | 6/1969 | Lucas | 260—78 L |
| 3,484,415 | 12/1969 | Sahler | 260—78 L |

WILLIAM H. SHORT, Primary Examiner

L. M. PHYNES, Assistant Examiner